May 22, 1956     H. J. GRAVES     2,746,345
PICTURE PREVIEWER AND PROJECTOR DEVICE
Filed Aug. 5, 1952     2 Sheets-Sheet 1
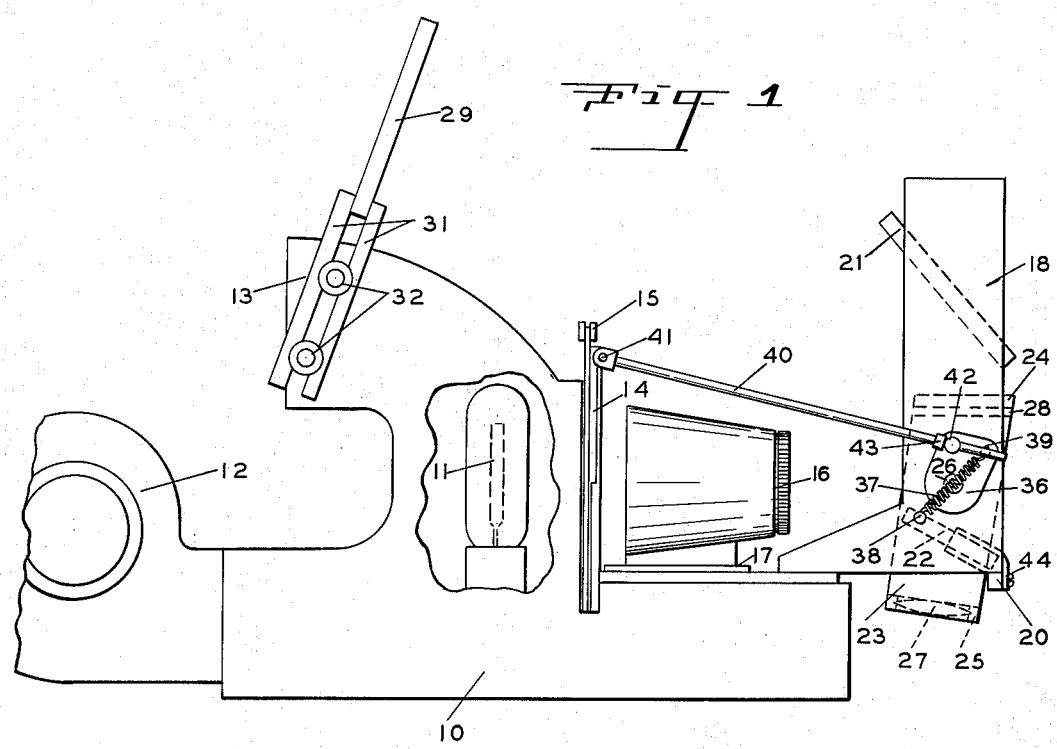
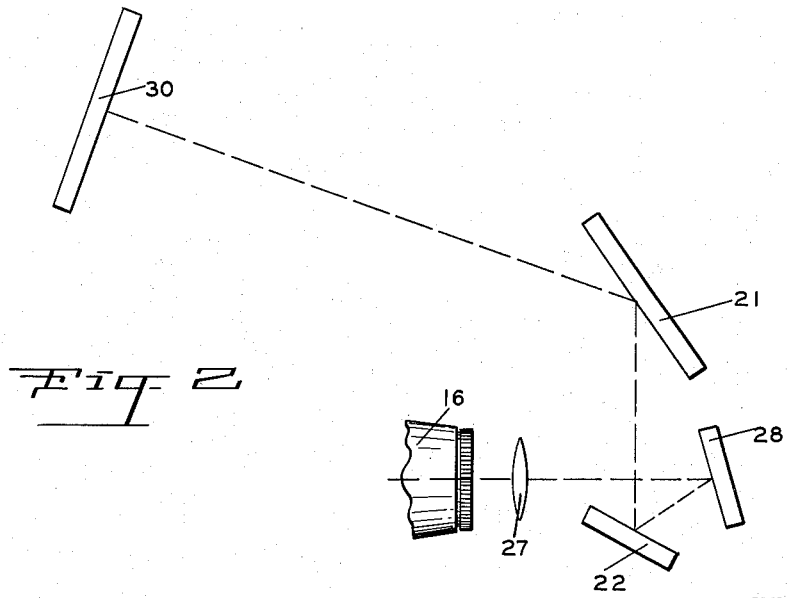
INVENTOR.
HAROLD J. GRAVES
BY
ATTORNEYS May 22, 1956 H. J. GRAVES 2,746,345
PICTURE PREVIEWER AND PROJECTOR DEVICE
Filed Aug. 5, 1952 2 Sheets-Sheet 2
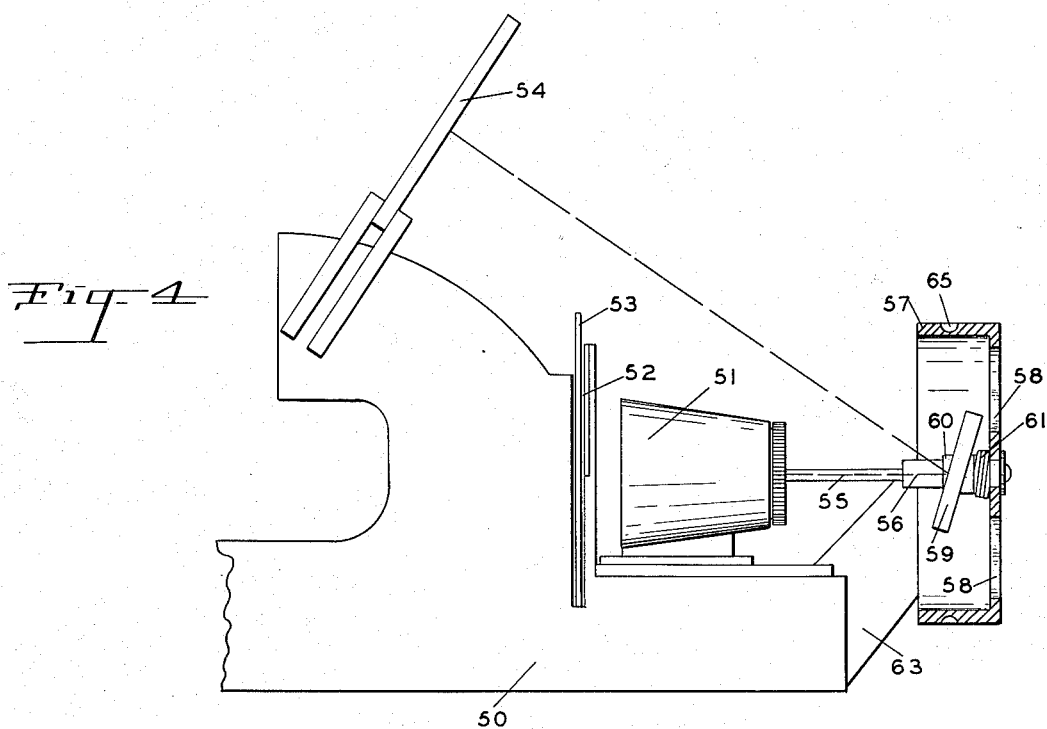
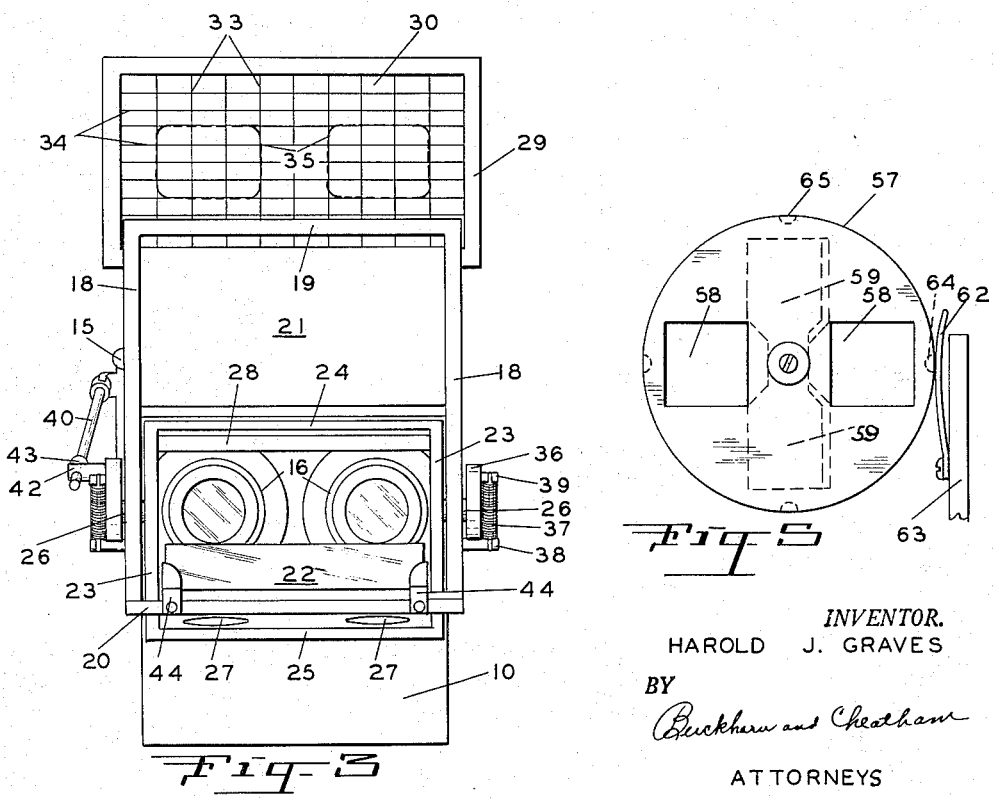
INVENTOR.
HAROLD J. GRAVES
BY
Buckhorn and Cheatham
ATTORNEYS United States Patent Office 2,746,345
Patented May 22, 1956

2,746,345

PICTURE PREVIEWER AND PROJECTOR DEVICE

Harold J. Graves, Portland, Oreg., assignor to Sawyer's Inc., Progress, Oreg., a corporation of Oregon Application August 5, 1952, Serial No. 302,651

6 Claims. (Cl. 88—27)

My present invention relates to projection apparatus and comprises means whereby the operator of a projector may check the alignment, orientation and character of the image prior to projecting the image upon the viewing surface. The present invention is of particular utility in connection with stereoscopic picture projection, but many advantages are also derived by use of the present invention in the projection of single pictures, and in the broadest aspects of the invention a projector of any type may be utilized in connection therewith.

The principal object of the present invention is to provide relatively simple means for viewing the image being created by the projection apparatus prior to flashing the image on the screen. The operator may insert a slide or transparency holder improperly so that the image is not correctly registered with the projection lenses, or the slide or holder may be upside down, or the operator may have the wrong picture in the projector. The latter occurrence is particularly embarrassing to a lecturer commenting upon a series of pictures, and in any event improper registry of the pictures is annoying and may subject the viewers to eyestrain, particularly in the viewing of polarized stereoscopic views through polarized spectacles.

An advantage derived from the construction is that the operator is enabled to adjust the projection apparatus to create sharp, properly aligned and properly oriented images prior to projecting the images onto the viewing surface, thus relieving the audience from annoyance and eyestrain.

A further object of the present invention is to provide an apparatus of the character described which comprises previewing means so arranged that the operator may adjust the relative positions and arrangements of the various lenses and the like in a projector, and may then project the picture onto the screen without requiring the audience to watch the distorted or moving image while the adjustments are being effected.

A further object of the present invention is to provide apparatus of the character disclosed which may be utilized in projectors designed to rotate, step by step, a holder having a plurality of opposed pairs of stereoscopic transparencies arranged in a circle, the apparatus comprising means for disposing a movable mirror in the path of the beams through the transparencies during each displacement of the holder, which mirror will remain in beam-blocking position until the operator desires to remove it therefrom.

The objects and advantages of the present invention will be more readily understood by reference to the accompanyig drawings wherein several forms of the present invention are illustrated, and in which like numerals refer to like parts throughout.

In the drawings,

Fig. 1 is a side elevation, with parts broken away, of a projector having one form of the present invention associated therewith;

Fig. 2 is a schematic view of the apparatus of Fig. 1 in operation;

Fig. 3 is a front view of the apparatus of Fig. 1;

Fig. 4 is a view similar to Fig. 1 of a modified form of the apparatus; and

Fig. 5 is a front view of a portion of the apparatus disclosed in Fig. 4.

A projector is illustrated in the present disclosure in sufficient detail to enable the principles of the present invention to be understood, the projector being generally indicated by the numeral 10 in Figs. 1 and 3. The projector includes a source of light, such as the incandescent lamp 11, with which may be associated means for creating parallel beams of light of equal intensity as disclosed in the patent to Wilhelm B, Gruber, No. 2,527,106, issued October 24, 1950, or equivalent means. A blower 12 is included in the projecting apparatus to direct a stream of cooling air around the source of light and rearwardly through an outlet duct 13. The instant projector is of the type designed to project stereo-paired transparencies onto a viewing screen, the transparencies being mounted in opposed pairs in a disc holder which comprises means to permit step-by-step rotation of the holder in order to bring successive pairs of transparencies into position to be projected. The holder is inserted into a slot 14 in the projector and maintained therein in an uprigh plane in front of the light creating means, and a manually engageable lever 15 projects laterally from the slot and includes means (not shown) for achieving step-by-step rotation of the holder, as disclosed and claimed in the copending application of Gordon N. Smith, Serial No. 160,272, filed May 5, 1950, now Patent No. 2,625,078, issued January 13, 1953. Any suitable means may be provided to achieve this purpose, and it is within the scope of the present invention that a single transparency slide may be maintained in the upright plane between the source of illumination and the front end of a two-dimensional projector, or a stereoscopic pair of transparencies arranged in a rectangular holder may be so maintained in a stereoscopic projector.

In accordance with the present invention, a pair of lens means 16 are arranged in front of the plane of the transparency holder, the lens means being disposed to project magnified images of the beams of light onto a viewing surface as disclosed in the above-identified patent to Gruber. The lens means are mounted upon adjustably mounted standards 17 associated with the base of the projector in suitable manner whereby proper adjustment of the lens means may be effected to create properly aligned, superimposed images on the screen. Any suitable means may be incorporated in the projector for achieving this function, such as disclosed in the copending application of Wilhelm B. Gruber, Serial No. 147,305, filed March 2, 1950, now Patent No. 2,700,322, dated January 25, 1955. Details of the adjusting means for the lenses are not disclosed herein as being no part of the present invention, but it is to be appreciated that a principal purpose of the present invention is to enable the operator correctly to adjust the lenses in order to have stereoscopic images properly aligned with each other. This is particularly important in the projection of stereoscopic pairs, the images of which are filtered through polarizing screens and viewed through polarizing spectacles. Improper registry of stereoscopic images on a viewing screen can cause severe eyestrain and blurring or distortion of the resulting three-dimensional effect.

In accordance with the present invention I provide reflecting means mounted on the projection apparatus in front of the lens means 16, which reflecting means includes a movably mounted, opaque mirror which may be moved into and out of the beams of light from the lens means, the reflecting means being arranged to direct the reflecting beams rearwardly over the projecting apparatus onto a frosted, translucent screen visible to the operator of the projection apparatus. The beams of light are thus intercepted and the audience screen will remain blank while the operator inspects the images to determine whether the proper picture is being projected and the picture is oriented correctly and, in the case of stereoscopic projection, whether the pairs of images are correctly related to each other. In the form of the invention illustrated in Figs. 1, 2 and 3, the reflecting means is mounted in a frame comprising a spaced pair of uprights 18, an upper cross-bar 19, and a lower cross-bar 20. Fixedly mounted in the frame and extending transversely thereacross is an upper, opaque mirror 21, the reflecting surface of which is directed rearwardly and downwardly, and a lower, opaque mirror 22, the reflecting surface of which is directed forwardly and upwardly. A movable frame comprising a spaced pair of normally vertical members 23 connected together by a pair of normally horizontal members 24 and 25 is pivotally attached to the uprights 18 of the fixed frame by a pair of opposed, coaxial trunnions 26 arranged in a horizontal plane. A pair of lenses 27 is mounted in the member 25 and a mirror 28 is mounted against the inner surface of the member 24. When the pivoted frame is in normal position, as illustrated in Figs. 1 and 3, the beams of light from the transparencies through the lens means 16 will be directed onto the audience screen. The arrangement is such that movement of the pivoted frame to an operative position places the optical centers of the lenses 27 in optical alignment with the lens means 16 and moves the mirror 28 into position to block and reflect the beams of light. The mirror 28 is inclined so as to direct the reflected beam onto the mirror 22, from which it is reflected onto the mirror 21, which in turn reflects it rearwardly over the top of the projection apparatus. A frame 29 supports a frosted, translucent screen 30 in position to intercept the reflected beam, the frame 29 being mounted on the projector through the medium of legs 31 attached thereto and adjustably fastened to the air outlet duct 13 by means of thumb nuts 32. The screen 30 is preferably provided with a grid comprising vertical lines 33 and horizontal lines 34, the lines being so calibrated with respect to the images transmitted to the screen that the respective horizontal and vertical edges of the images will coincide with certain grid lines, as indicated by means of the dash lines 35. It is to be appreciated that the lenses 27 are properly designed according to optical laws to create clear images on the screen 30. The operator standing behind the projection apparatus may thus view the images and, if necessary, change the transparency holder, reverse its position, adjust its position or, if the projection apparatus is so designed, adjust the relative positions of the lens means 16. While this is being accomplished, the audience is not subjected to eyestrain and annoyance by being required to observe the illuminated screen.

In order to effect movement of the movable mirror, the frame holding the movable mirror is linked to the transparency holder feeding lever 15 by a linkage including an over-center device, a rigid link rod, and means connecting the over-center device to the link rod in one direction of movement, namely, the feeding movement. By reason of this construction the holder feeding lever may return to its normal position without effecting return of the movable mirror, and the movable mirror may be manually returned to its normal position out of the path of the created beams of light when the operator desires. The linkage means comprises a pair of over-center cranks 36 fastened to the outwardly projecting ends of the trunnions 26. Over-center springs 37 are tensioned between pins 38 mounted on the upright members 18 and pins 39 mounted on the cranks 36. A linking rod 40 is pivotally connected at 41 to the feeding lever 15 and slidably extends through an opening in a rotatable member 42 projecting laterally from the crank 36 at the same side of the projector as the feeding lever 15. An abutment 43 fixed to the linking rod 40 at the proper position functions as a stop to hold the movable frame in its inoperative position when the springs 37 have returned to over-center in one direction, and pushes against the member 42 to shove the crank 36 and cause the springs 37 to move the frame in the opposite direction into operative position. As will be seen most clearly in Fig. 3, the mirror 22 is mounted upon the cross-member 20 by means of brackets 44 so that the lateral edges of the mirror are spaced from the inner surfaces of the uprights 18 in order to permit movement of the inner frame to the proper extent. It is to be appreciated that suitable adjustment means (not shown) may be provided to arrest the movable mirror at the proper position and to effect proper adjustment of the operating linkage.

A relatively simplified form of the invention is illustrated in Figs. 4 and 5 wherein there is shown a projector 50 provided with lens means 51 and having a slot 52 therein in which may be positioned any suitable type of transparency holder 53. A frosted, translucent screen 54, as previously described, is mounted on the projector. In the present instance, a horizontally disposed mounting rod 55 is suitably mounted on a fixed portion of the frame of the projection apparatus, the rod being provided with an enlarged collar 56 near its forward end. A shield 57 is rotatably mounted on the forward end of the rod 55, the shield being provided with a pair of diametrically opposed windows 58 which may be moved into and out of the paths of the beams of light. The intermediate quadrants of the shield are imperforate so that when positioned along a horizontal plane they will block the beams of light. A reflecting mirror comprising a pair of opposed arms 59 mounted on a central hub 60 is rotatably mounted on the rod 55, the hub 60 bearing against the collar 56, and the mirror is adjustably connected for rotation with the shield 57 by means of a spring device 61 interposed between the shield and the hub 60, the arrangement being such that the mirror normally rotates with the shield but its relative position may be adjusted by slipping it with respect thereto. The shield may be rotated in any desired manner, such as by manually grasping the rim thereof. The shield is held in operative or inoperative position by means of a spring arm 62 mounted on a standard 63 fixed to the frame of the projector, the spring arm being provided with a detent 64 engageable with depressions 65 in the rim of the shield. This embodiment of the invention illustrates utility of the invention in a very simple form, inasmuch as the operator may manually position the mirror arms 59 in position to reflect images onto the screen 54 and, once having made the proper adjustments, he may move the mirrors into inoperative position and project pictures as desired without necessarily imposing the mirrors in the paths of the beams of light at each change of scene.

Having illustrated and described several embodiments of my present invention, it should be apparent to those skilled in the art that the same permits of modification in arrangement and detail thereof.

I claim:

1. Projection apparatus comprising means to hold a pair of transparencies in horizontally disposed relation in an upright plane, a source of light behind the plane of said transparencies, a pair of lens means positioned ahead of the plane of said transparencies in position to magnify the images thereof, reflecting means including an opaque mirror, means movably mounting said mirror for movement into and out of the beams of light emerging from said lens means, said reflecting means, when said mirror is positioned in the beams of light, reflecting all of the beams of light rearwardly above said lens means, and a frosted translucent screen mounted on said projection apparatus in the paths of the reflected beams of light, said screen having grid lines thereon whereby the operator may check the vertical and horizontal alignment of the images.

2. Projection apparatus comprising means to hold a transparency holder having a plurality of pairs of transparencies arranged in a circle thereabout and adapted to be rotated step by step to bring successive pairs of transparencies into proper position for projection, said projection apparatus comprising a source of light arranged to illuminate said transparencies, lens means arranged to project the images therefrom, and a manually operable lever for effecting step-by-step rotation of said holder, reflecting means including an opaque mirror, means movably mounting said mirror for movement into and out of the beams of light emerging from said lens means, said reflecting means, when said mirror is positioned in the beams of light, reflecting all of the beams of light rearwardly above said lens means, a frosted translucent screen mounted on said projection apparatus in the paths of the reflected beams of light, and means linking said mirror to said lever whereby feeding operation of said lever moves said mirror into the paths of the beams of light emerging from said lens means.

3. Projection apparatus comprising means to hold a transparency holder having a plurality of pairs of transparencies arranged in a circle thereabout and adapted to be rotated step-by-step to bring successive pairs of transparencies into proper position for projection, said projection apparatus comprising a source of light arranged to illuminate said transparencies, lens means arranged to project the images therefrom, and a manually operable lever for effecting step-by-step rotation of said holder, reflecting means including an opaque mirror, means movably mounting said mirror for movement into and out of the beams of light emerging from said lens means, said reflecting means, when said mirror is positioned in the beams of light, reflecting all of the beams of light rearwardly above said lens means, a frosted translucent screen mounted on said projection apparatus in the paths of the reflected beams of light, and means linking said mirror to said lever whereby feeding operation of said lever moves said mirror into the paths of the beams of light emerging from said lens means, said linking means comprising an over-center spring device connected to said mirror, a link connected to said lever, and a one-way drive connection between said link and said over-center device arranged to swing said device over-center in the direction to position said mirror in the beams of light when said lever is operated in a feeding direction and permitting return of said lever and said link to initial position in readiness for a subsequent feeding operation without effecting return of said mirror.

4. Projection apparatus comprising means to hold a pair of transparencies in horizontally disposed relation in an upright plane, a source of light behind the plane of said transparencies, a pair of lens means positioned ahead of the plane of said transparencies in position to project the images thereof, a shield, said shield having a diametrically opposed pair of windows therein, means rotatably mounting said shield in front of said lens means whereby said windows may be brought into position to permit passage of the beams of light from said lens means, and an inclined mirror connected to said shield for rotation therewith and positioned between said shield and said lens means, said mirror including diametrically opposed portions positioned between the windows in said shield whereby when the beams of light are blocked by said shield they are likewise totally intercepted by said mirror portions and reflected rearwardly above said projector, and a frosted translucent screen mounted on said projector in position to intercept the reflected beams of light.

5. Projection apparatus comprising means to hold a transparency holder having a plurality of pairs of transparencies arranged in a circle thereabout and adapted to be rotated step by step to bring successive pairs of transparencies into proper position for projection, said projection apparatus comprising a source of light arranged to illuminate said transparencies, lens means arranged to project the images therefrom, and feeding means for effecting step-by-step rotation of said holder, reflecting means including an opaque mirror, means movably mounting said mirror for movement into and out of the beams of light emerging from said lens means, said reflecting means, when said mirror is positioned in the beams of light, reflecting all of the beams of light rearwardly above said lens means, a frosted translucent screen mounted on said projection apparatus in the paths of the reflected beams of light, and one-way driving means linking said mirror to said feeding means for moving said mirror into the paths of the beams of light emerging from said lens means, and means for displacing said mirror from the paths of the beams of light independently of said feeding means.

6. Projection apparatus comprising means to hold a transparency holder having a plurality of pairs of transparencies arranged in a circle thereabout and adapted to be rotated step by step to bring successive pairs of transparencies into proper position for projection, said projection apparatus comprising a source of light arranged to illuminate said transparencies, lens means arranged to project the images therefrom, and a manually operable lever movable from an initial position to an advanced position for effecting step-by-step rotation of said holder, reflecting means including an opaque mirror, means movably mounting said mirror for movement into and out of the beams of light emerging from said lens means, said reflecting means, when said mirror is positioned in the beams of light, reflecting all of the beams of light rearwardly above said lens means, a frosted translucent screen mounted on said projection apparatus in the paths of the reflected beams of light, said screen having grid lines thereon whereby the operator may observe the relative positions of the beams of light so as to enable him to effect relative adjustment thereof for proper viewing prior to projecting the images upon the screen, means connected to said lever and effective upon operative movement of said lever from its initial position to its advanced position to swing said mirror into the paths of said beam of light, said means comprising a one-way driving connection with said mirror whereby when said lever is returned to its initial position said mirror remains in the paths of said beam of light, and separate means for swinging said mirror out of the paths of the beam of light subsequent to return of said lever to its initial position.

References Cited in the file of this patent
UNITED STATES PATENTS

| Number | Name | Date |
|---|---|---|
| 1,650,479 | Woodland | Nov. 22, 1927 |
| 2,021,533 | Wolfe | Nov. 19, 1935 |
| 2,089,703 | May | Aug. 10, 1937 |
| 2,120,596 | Avey | June 14, 1938 |
| 2,525,598 | Gruber | Oct. 10, 1950 |
| 2,580,874 | Wottring | Jan. 1, 1952 |
| 2,598,573 | Lutes | May 27, 1952 |
| 2,625,078 | Smith | Jan. 13, 1953 |